US009165318B1

(12) United States Patent
Pauley et al.

(10) Patent No.: US 9,165,318 B1
(45) Date of Patent: Oct. 20, 2015

(54) AUGMENTED REALITY PRESENTATION

(71) Applicant: AMAZON TECHNOLOGIES, INC., Reno, NV (US)

(72) Inventors: Devin Bertrum Pauley, Mountain View, CA (US); Connor Spencer Blue Worley, San Diego, CA (US); Edward Albert Liljegren, San Francisco, CA (US); Peter A. Larsen, Seattle, WA (US); Jung Sik Yang, Santa Clara, CA (US); Thomas Bruno Mader, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 311 days.

(21) Appl. No.: 13/904,597

(22) Filed: May 29, 2013

(51) Int. Cl.
G09G 5/00 (2006.01)
G06Q 30/00 (2012.01)
G06Q 30/06 (2012.01)

(52) U.S. Cl.
CPC .................................. *G06Q 30/0623* (2013.01)

(58) Field of Classification Search
None
See application file for complete search history.

(56) References Cited

U.S. PATENT DOCUMENTS

| 6,856,324 B2* | 2/2005 | Sauer et al. ................... 345/633 |
| 7,379,077 B2* | 5/2008 | Bani-Hashemi et al. ..... 345/633 |
| 7,605,826 B2* | 10/2009 | Sauer ............................. 345/633 |
| 8,803,914 B2* | 8/2014 | Chen et al. ..................... 345/633 |
| 2009/0144173 A1* | 6/2009 | Mo et al. .......................... 705/27 |
| 2012/0113141 A1* | 5/2012 | Zimmerman et al. ......... 345/633 |
| 2012/0306919 A1* | 12/2012 | Suzuki et al. .................. 345/633 |
| 2013/0083065 A1* | 4/2013 | Schulze ......................... 345/633 |
| 2013/0215116 A1* | 8/2013 | Siddique et al. .............. 345/420 |
| 2013/0254066 A1* | 9/2013 | Amacker et al. ............. 705/26.8 |
| 2014/0100997 A1* | 4/2014 | Mayerle et al. .............. 705/27.2 |
| 2014/0149264 A1* | 5/2014 | Satyanarayana et al. .... 705/27.2 |

* cited by examiner

*Primary Examiner* — Ryan R Yang
(74) *Attorney, Agent, or Firm* — Lindauer Law, PLLC

(57) ABSTRACT

Described are methods and systems of providing an augmented experience on a user device to facilitate user interaction with one or more virtual items. An augmented image comprising an actual object and a virtual item is generated and presented in a user interface. The user interface allows the user to lock a relative position of the virtual item as presented, such that the user may appear to "move" the virtual item. The user interface may also provide sizing information of the virtual item relative item to the actual object.

20 Claims, 11 Drawing Sheets

AUGMENTED REALITY PRESENTATION

BACKGROUND

A wide variety of physical items are available for acquisition through various online merchants. Some of these items are available in several different sizes. For example, hand tools may be sized for a particular grip, rings for a particular size finger, bracelets for a wrist, hats for a head, a shoe for a foot, and so forth.

Figure 1:
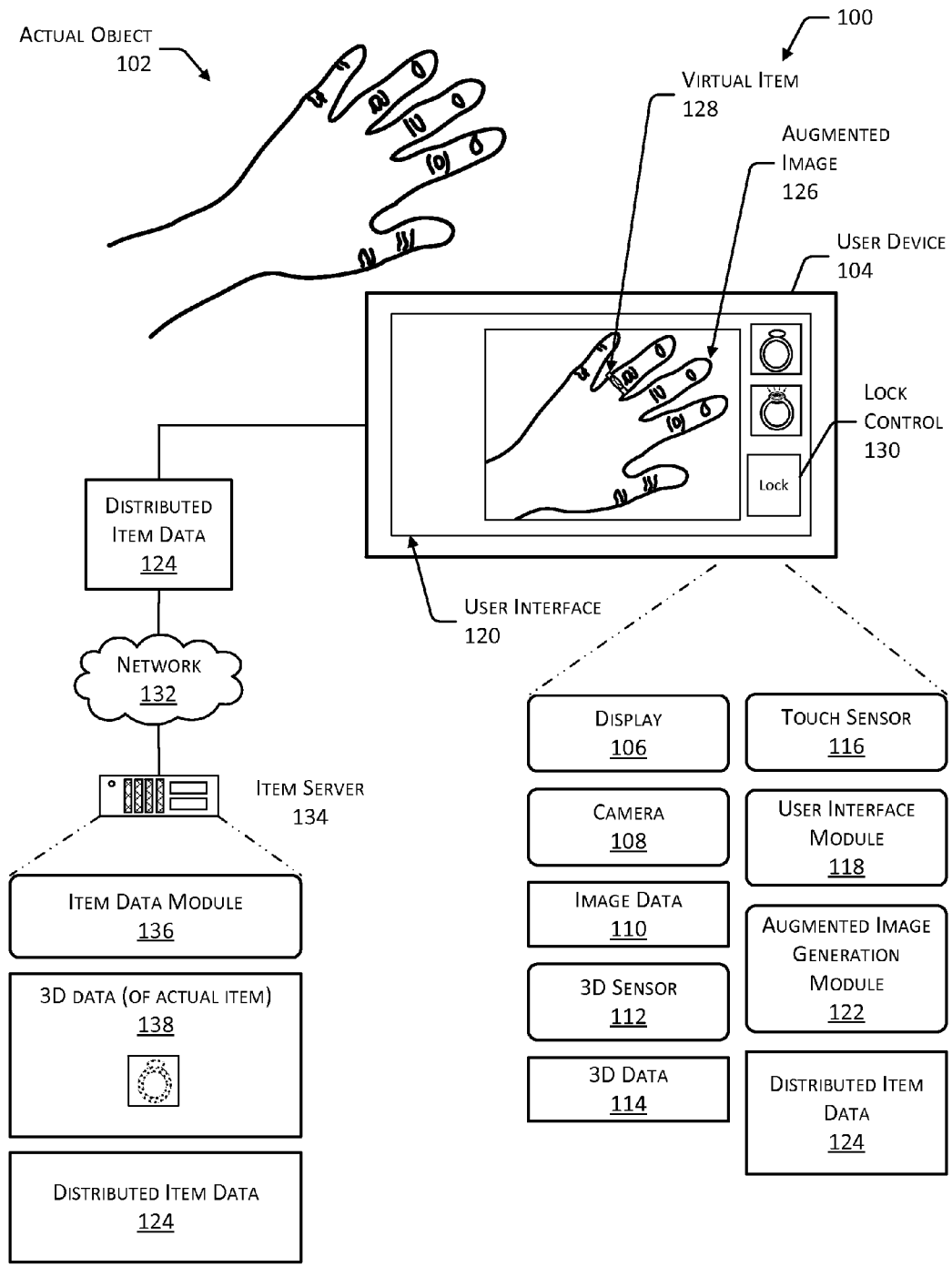
FIG. 1 is an illustrative system for providing an augmented reality presentation comprising an augmented image merging actual objects with images of virtual items.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

As mentioned above, a wide variety of physical items are available for acquisition through various online merchants. These items may be available in different sizes. For example, hand tools may be sized for a particular grip, rings for a particular size finger, bracelets for different sizes of wrists, hats for different head sizes, shoes for different foot sizes, and so forth. Traditionally, customers use an actual item or a proxy item, such as a ring sizing tool, to test the fit. Furthermore, many users may have difficulty judging the appearance of the item as worn or used, without the actual item. Providing the actual item or the proxy item to the user imposes logistical issues, particularly in the case of an online merchant. In the traditional situation, the user is shipped an actual item for sale and returns the actual item if the fit or appearance is unsatisfactory. This increases shipping costs, delays, and may result in an unsatisfying user experience. Instead of, or in addition to shipping the actual item, a storefront may be maintained to provide access to samples of the actual items. However, maintaining the storefront imposes logistical issues and corresponding costs as well.

This disclosure describes techniques and devices configured to facilitate presentation to a user of virtual items representative of actual items. A user device presents, on a display, an augmented image that includes an image of an actual object and a generated image of a virtual item. The generated image of the virtual item is based on information gathered from the actual item. In one implementation, the actual object may be the user's hand, while the virtual item may be an ornamental finger ring ("ring"). These techniques may be applied to other actual objects and virtual items. For example, the actual object may be a window, pet, appliance alcove or recess, and so forth, while the virtual item may be a window covering, pet accessory, appliance, and so forth.

In some situations, bandwidth may be limited between the user device and a server storing details about the virtual item. To facilitate low latency generation of the image of the virtual item, distributed item data may be sent to the user device. The distributed item data includes common data and compact data. The common data, such as information about materials, texture map data, and so forth, may be preloaded or previously stored on the user device. For example, the common data may include information which is indicative of the visual characteristics of gold, platinum, silver, diamonds, garnet, ruby, various cuts or geometries of gemstones, and so forth. The common data may be transferred when a higher-bandwidth connection is available, such as a Wi-Fi™ connection, as compared to a wireless wide area network ("WWAN") such as 3G or 4G, using a Universal Serial Bus ("USB") connection when coupled to a host device, and so forth.

The user device may request the compact data from a server or another device. The compact data, contains one or more references to at least a portion of the common data, which has been previously stored on the user device. For example, the compact data referring to an actual item made of gold would include a reference to the gold in the common data, rather than including the descriptive data for gold. The user device generates the image of the virtual item using compact data received from a server in conjunction with the common data. By using the compact data, details for a wide variety of virtual items may be quickly transferred to the user device. Continuing the example, the compact data transferred to the user device may comprise references to "circular ring, elliptical shank cross section, shank made of gold, smooth finish, no setting". Rather than transferring a large file containing three-dimensional point data representative of the actual item, a relatively smaller piece of compact data containing references to the common data is transferred. This significantly reduces the time required to transfer to the user device, allowing the user to quickly browse through and see information on many different virtual items.

Furthermore, use of the common data and the compact data reduces overall storage requirements on the user device for large numbers of different virtual items. For example, as the user starts to browse a variety of different wedding rings, compact data describing several hundreds or thousands of wedding rings may be quickly downloaded and stored. The compact data in combination with the common data may then be used to generate the image of the virtual item for presentation in a user interface.

The user interface may present the augmented image and provide for user controls that allow for manipulation of the virtual item. The user interface may present an initial pose or orientation of the actual object, such as a silhouette of a hand in a particular orientation, for the user to mimic. Use of this initial pose may impose boundaries as to possible positions, minimizing processing resources used in determining the pose of the actual object, generating the virtual image, and so forth.

The user interface may be configured such that the image of the virtual item tracks or follows at least a portion of the actual object in the augmented image. For example, the image of the virtual item representative of the ring may follow the user's hand movements, such that the image of the virtual item appears to remain positioned on the proximal phalanx bone of a left hand ring finger.

The user may wish to change apparent placement of the virtual item on the image of the actual object. Continuing the example, the user may wish to "move" the image of the virtual item representative of the ring to the intermediate phalanx bone of the left hand ring finger. In some implementations, the user may activate a lock control, which in turn initiates a position lock function. In one implementation, the lock control may be a specified position at a left side, a right side, or a left and right side of the touch sensor, which is accessible by the user's left thumb or right thumb, respectively. For example, while the user's thumb activates the lock control, the virtual item remains in a fixed location within the augmented image, while the actual object such as the user's hand may be moved around to reposition the apparent location of the virtual item with respect to the user's hand.

The user interface may also be configured to provide feedback to the user about the fit of the virtual item with regard to the actual object. This feedback may be provided based on information about the physical measurements of the actual object, as well as the physical measurements of the actual item represented by the virtual item. In one implementation, the user device may be configured with a three-dimensional sensor configured to acquire three-dimensional data about the actual object. This data may be used to determine the physical measurements of the actual object, such as a portion of the user's finger, and indicate whether a virtual item having a particular size, such as a ring, will fit.

By providing these functions with the user interface, the user experience in acquiring actual items is improved. The user is readily able to see the augmented image showing the actual object and the virtual item, readily manipulate the virtual item, and determine where and whether the virtual item will fit. Once satisfied, the user may place an order for delivery of the actual item.

Illustrative System

FIG. 1 is an illustrative system 100 for providing an augmented reality presentation comprising an augmented image merging actual objects with images of virtual items. An actual object 102, such as a user's hand, is physically present. The actual object 102 fills a volume of space, has physical measurements, and a shape.

Physically close or proximate to the actual object 102 is a user device 104. The user device 104 may comprise a tablet computer, personal computer, electronic book (eBook) reader, television, in-vehicle entertainment system, gaming console, smartphone, wearable computing device, and so forth.

The user device 104 may include a display device 106 or "display". The display 106 is configured to present images to a user. A camera 108 may be configured to acquire image data 110 of the actual object 102. A three-dimensional ("3D") sensor 112 is configured to acquire 3D data 114 about one or more objects in a sensor field of view, such as the actual object 102. For example, the 3D data 114 may be descriptive of the user's hand. The 3D data 114 may comprise a depth map, point cloud, vector mapping, and so forth.

The user device 104 may include a touch sensor 116 or other input device such as a button, keypad, joystick, and so forth. In some implementations, the display 106 and the touch sensor 116 may be combined into a touchscreen.

A user interface module 118 is configured to provide a user interface 120 on the user device 104. This user interface 120 may comprise a graphical user interface, such as depicted here. The user interface module 118 is configured to process inputs, such as those made to the touch sensor 116, and provide corresponding outputs to the user, such as on the display 106. For example, the user interface 120 may present images of several rings available for purchase. The user interface module 118 may present controls, various information such as information about sizing, pricing, customer reviews, purchase controls, and so forth.

An augmented image generation module 122 is configured to access distributed item data 124 and generate an augmented image 126 including images of one or more virtual items 128 combined with an image of the actual object 102. The distributed item data 124 comprises information indicative of, or descriptive of, virtual items 128. The virtual items 128 are based on actual items. For example, the virtual item 128 may comprise a representation of a ring, while the actual item is the ring. The actual item may also include a wrist bracelet, an ankle bracelet, a watchband, an armlet, a toe ring, a hand tool, a hat, and so forth. The distributed item data 124 is discussed in more detail below with regard to FIG. 2.

The augmented image 126 may appear to be a composite of the image of the actual object 102 and image of the virtual item 128. The augmented image generation module 122 may be configured to track motion of the actual object 102 and maintain the image of the virtual item 128 in a consistent relative position. For example, the image of the virtual item 128 representative of a ring may follow the user's hand movements, such that the image of the virtual item 128 appears to remain positioned on the proximal phalanx bone of a left hand ring finger of the user. This tracking may include maintaining relative orientation. The augmented image generation module 122 may be configured such that, as the user rotates or otherwise changes the orientation of the actual object 102, the orientation of the virtual item 128 changes. For example, where the actual object 102 comprises a hand, as the hand is turned over such that the palm faces the camera 108, the underside of the ring shank may be visible, rather than a setting of the ring.

The tracking may be set to "snap" the position of the virtual item 128 to the image of the actual object 102 within a threshold value. The threshold value may be fixed or dynamically adjustable. For example, the threshold value may be fixed at 5 millimeters (mm), such that when the relative position of the virtual item 128 is brought to within 5 mm of the actual object 102, the virtual item 128 begins tracking with the actual object 102. The threshold value may be expressed as a linear function, exponential function, logarithmic function, and so forth.

The augmented image generation module 122 may work in conjunction with the user interface module 118. For example, data received from touches on the touch sensor 116 may be provided to the augmented image generation module 122 to modify the augmented image 126.

The user interface module 118 may provide the user interface 120 with a lock control 130. The user may wish to change apparent placement of the virtual item 128 with respect to the image of the actual object 102. For example, the user may wish to "move" the image of the virtual item 128 representative of the ring from one position on a finger to another. The lock control 130 is configured to initiate a position lock function. When the position lock function is active, the virtual item 128 remains in a fixed location within the augmented image 126, while the actual object 102 may be moved relative to the virtual item 128. Said another way, when the position lock function is engaged, the position of the virtual item 128 on the display 106 may remain relatively constant. In some implementations, while the position is fixed, the orientation may change. For example, as a user rotates their hand, the virtual item 128 may also rotate.

In some implementations, the position lock control 130 may be positioned in the user interface 120 to be actuated by a thumb of the user. For example, the position lock control 130 may be positioned at a left side, a right side, or a left and right side of the touch sensor 116 that is accessible by the user's left thumb or right thumb, respectively. In this arrangement, the user may readily use one hand to manipulate or be the actual object 102, while the other hand is able to activate the position lock control 130 as desired. The positioning of elements in the user interface 120 may be based at least in part on an orientation of the actual object 102. For example, when a left hand appears in the image data 110, the position lock control 130 may be positioned on the right side of the user interface 120. Likewise, the user interface 120 may be mirrored and flipped horizontally such that when a right hand appears in the image data 110, the position lock control 130 may be positioned on the left side of the user interface 120. The user device 104 may be configured to couple to one or more networks 132. The network 132 may comprise a public network, private network, local area network, wide area network, and so forth. For example, the user device 104 may be configured to couple to a 3G WWAN, which in turn provides access to the Internet.

The user device 104 may use the network 132 to communicate with one or more servers, such as the item server 134. The item server 134 is configured to maintain information about one or more of the virtual items 128. For example, the item server 134 may provide a catalog of virtual items 128 available from an online merchant. The item server 134 provides an item data module 136. The item data module 136 may be configured to respond to requests for information about the virtual items 128 and provide distributed item data 124, or a portion thereof, to the user device 104. The item data module 136 may also be configured to process 3D data 138 about the actual item. The item data module 136 may use the 3D data 138 to generate the distributed item data 124, which is representative of the virtual item 128. For example, a device having a 3D sensor may send the 3D data 138 of the actual item to the item server 134. In another implementation, the 3D data 138 may be based on computer aided design ("CAD") data, manufacturing specifications, and so forth. For example, the 3D data 138 may be derived from 3D CAD files and a bill of materials indicating the composition of the various components. The item data module 136 may use this 3D data 138 to generate the distributed item data 124. The distributed item data 124 is discussed in more detail below with regard to FIG. 2.

The item server 134 may send the distributed item data 124 to the user device 104 using the network 132. The augmented image generation module 122 of the user device 104 then generates the augmented image 126 including the image of the virtual item 128.

Figure 2:
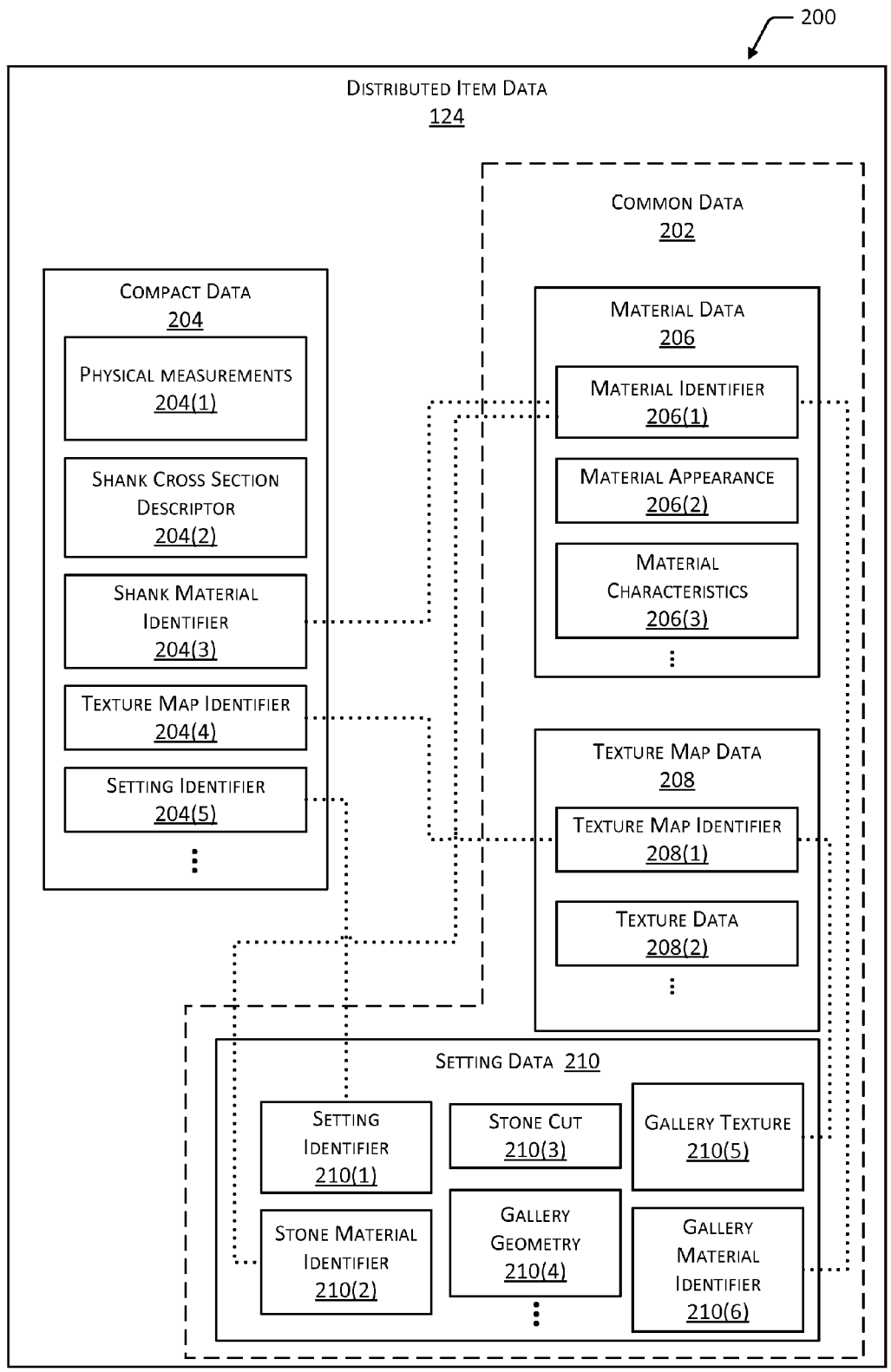
FIG. 2 is a block diagram of distributed item data comprising common data and compact data descriptive of one or more virtual items such as jewelry rings, which are sent to a user device for use in generation of the images of the virtual items.

FIG. 2 is a block diagram 200 of distributed item data 124. The augmented image generation module 122 may use the distributed item data 124 to generate an image of the virtual item 128, provide other information about the virtual item 128, or both.

The distributed item data 124 may comprise common data 202 and compact data 204. The common data 202 comprises information that may be applicable to a plurality of different virtual items 128. As shown in this figure by way of illustration and not as a limitation, where the virtual items 128 are rings, the common data 202 may include information about those rings. Ornamental rings worn as jewelry include several components, including the shank, setting, gallery, and so forth. The shank is the portion of the ring that wraps around at least a portion of the user's finger when worn and may also be known as a band. The setting is the portion of the ring other than the band, usually having some sort of stone or detailed ornamental portion. The gallery supports the setting, typically acting as a bridge or structure between the shank and the setting.

The material data 206 includes a material identifier 206(1). The material identifier 206(1) may comprise a number or string that uniquely identifies a particular grouping of material data 206 associated with a particular material. The material data 206 may include one or more of material appearance 206(2), material characteristics 206(3), and so forth. The material appearance 206(2) provides information as to visual characteristics of the material, such as color, luster, reflectivity, internal reflectance, and so forth. The material characteristics 206(3) may include elastic modulus, thermal conductivity, density, and so forth. Other characteristics about the material may also be provided. The material data 206 may describe metals, alloys, wood, minerals, plastics, ceramics, and so forth. For example, the material data 206 may describe a particular type of gold, a particular precious stone, or a type of leather.

The texture map data 208 includes a texture map identifier 208(1). The texture map identifier 208(1) may comprise a number or string that uniquely identifies a particular grouping of texture map data 208 associated with a particular texture map. The texture map data 208 may include texture data 208(2) such as a bitmap, raster image, color, surface contour pattern, and so forth. In some implementations, the texture map data 208 may include information associated with tactile presentation, such as surface roughness or texture, resiliency, and so forth. For example, where the user device 104 includes a haptic output device, a texture of the virtual item 128 may be presented for the user to feel.

The setting data 210 includes a setting identifier 210(1). The setting identifier 210(1) may comprise a number or string that uniquely identifies a particular grouping of setting data 210. The setting data 210 may include one or more of a stone material identifier 210(2), a stone cut 210(3), gallery geometry 210(4), gallery texture 210(5), gallery material identifier 210(6), and so forth. The stone material identifier 210(2) provides information on a stone or other central feature, in particular, the material of the stone. The stone material identifier 210(2) may refer to the material data 206 described above. The stone cut 210(3) may refer to data indicative of the cut or geometry of the stone, such as point cut, table cut, Mazarin cut, Old European Cut, polished ellipsoid, and so forth. As above, in some implementation, the stone cut 210(3) may comprise an identifier configured to refer to a table or other data structure containing predetermined information about various stone geometries. The gallery geometry 210(4) similarly characterizes the structure of the gallery, if any. The gallery texture 210(5) is descriptive of the ring's gallery, and may refer to the texture map data 208. The gallery material identifier 210(6) is descriptive of the material from which the gallery of the ring is made and may refer to the material data 206.

The compact data 204 is configured to refer, at least in part, to the common data 202 described above. By referring to the common data 202, the overall size of the compact data 204 is significantly reduced, compared to repeating or encoding the information sufficient to render the virtual item 128 on the user device 104.

The compact data 204 may comprise one or more physical measurements 204(1). These physical measurements 204(1) may include specific dimensions of one or more of a shank radius, shank inner diameter, shank outer diameter, shank thickness, setting size, and so forth. For example, the physical measurements 204(1) may designate the shank inner diameter as 17 mm. In some implementations, the physical measurements 204(1) may be provided with a bilateral tolerance value, such as plus or minus 0.5 mm.

The compact data 204 may include a shank cross section descriptor 204(2). The shank cross section descriptor 204(2) comprises data indicative of a particular cross sectional shape of the shank along a radial line, such as elliptical, round, square, square with chamfered edges, and so forth. The shank cross section descriptor 204(2) may comprise one or more vectors, equations, outlines, and so forth.

The compact data 204 includes references to one or more pieces of the common data 202. For example, the compact data 204 associated with a ring may include one or more of: a shank material identifier 204(3) configured to correspond to the material data 206, a texture map identifier 204(4) configured to correspond to the texture map data 208, or a setting identifier 204(5) configured to correspond to the setting identifier 210(1). Using this technique, the compact data 204 may be reduced to a very small parcel of data in most cases.

In some implementations, the common data 202 for one or more portions of the virtual item 128 may be unavailable. In these implementations, more detailed information may be included in the compact data 204. For example, for a gold ring having a gallery with a previously unrecorded geometry, the compact data 204 may include information directly descriptive of the gallery geometry 210(4), but use references to the common data 202 such as the material data 206 for gold.

While the common data 202 and the compact data 204 are described in relation to rings, the data may be descriptive of other items such as bracelets, hats, shoes, hardware, household appliances, and so forth. For example, the compact data 204 may encode virtual items 128 such as tools, appliances, and so forth.

Figure 3:
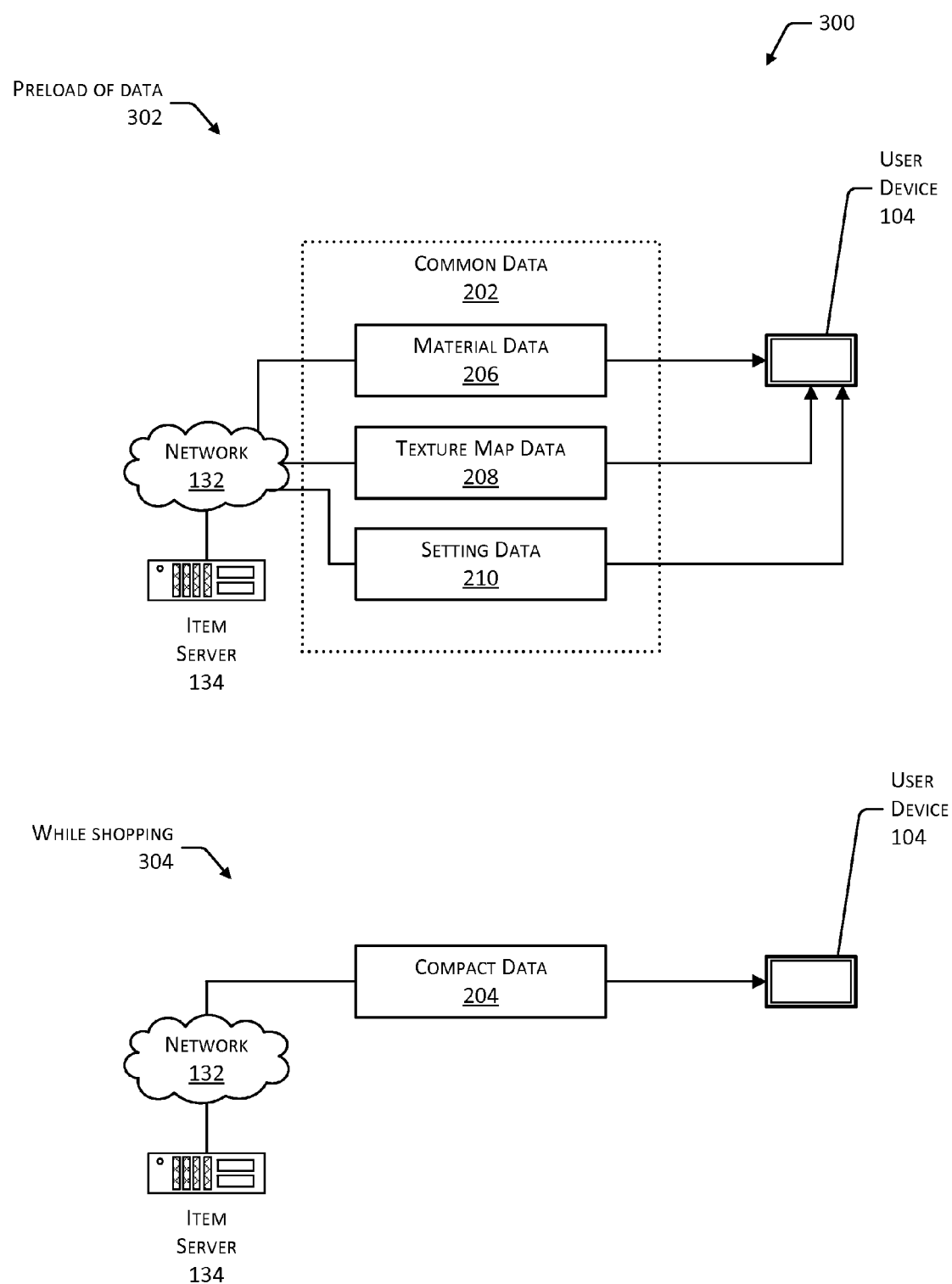
FIG. 3 illustrates preloading the common data on the user device and providing compact data at a later time.

FIG. 3 illustrates a system 300 of preloading the common data 202 on the user device 104 and providing compact data 204 at a later time. In this illustration, a view of the system during preload of the data 302 is depicted. Here, the common data 202 is being transferred to the user device 104. For example, the user device 104 may be at the user's home and able to access a high-bandwidth Internet connection using Wi-Fi™. The relatively large set of common data 202 may be transferred at this time, such as overnight while the user sleeps. Once the preload is complete, the user device 104 has at least a portion of the common data 202 available for use by the augmented image generation module 122.

A view of the system following the preload, such as while shopping 304, is also depicted. The compact data 204 is provided to the user device 104. The augmented image generation module 122 uses the compact data 204 in conjunction with the common data 202 to generate an image of the virtual item 128. The item server 134 may send compact data 204 after receiving a request from the user device 104. In another implementation, the item server 134 may send the compact data 204 without request. For example, the compact data 204 may be sent for virtual items 128 that are featured in an advertised special.

The relatively small size of the compact data 204 relative to the common data 202, or relative to the 3D data 138, reduces network data transmission costs, reduces latency, and so forth. This may improve the overall user experience.

In some implementations, the common data 202 may be updated over time. For example, additional updates to the common data 202 may be transmitted periodically to the user device 104.

Figure 4:
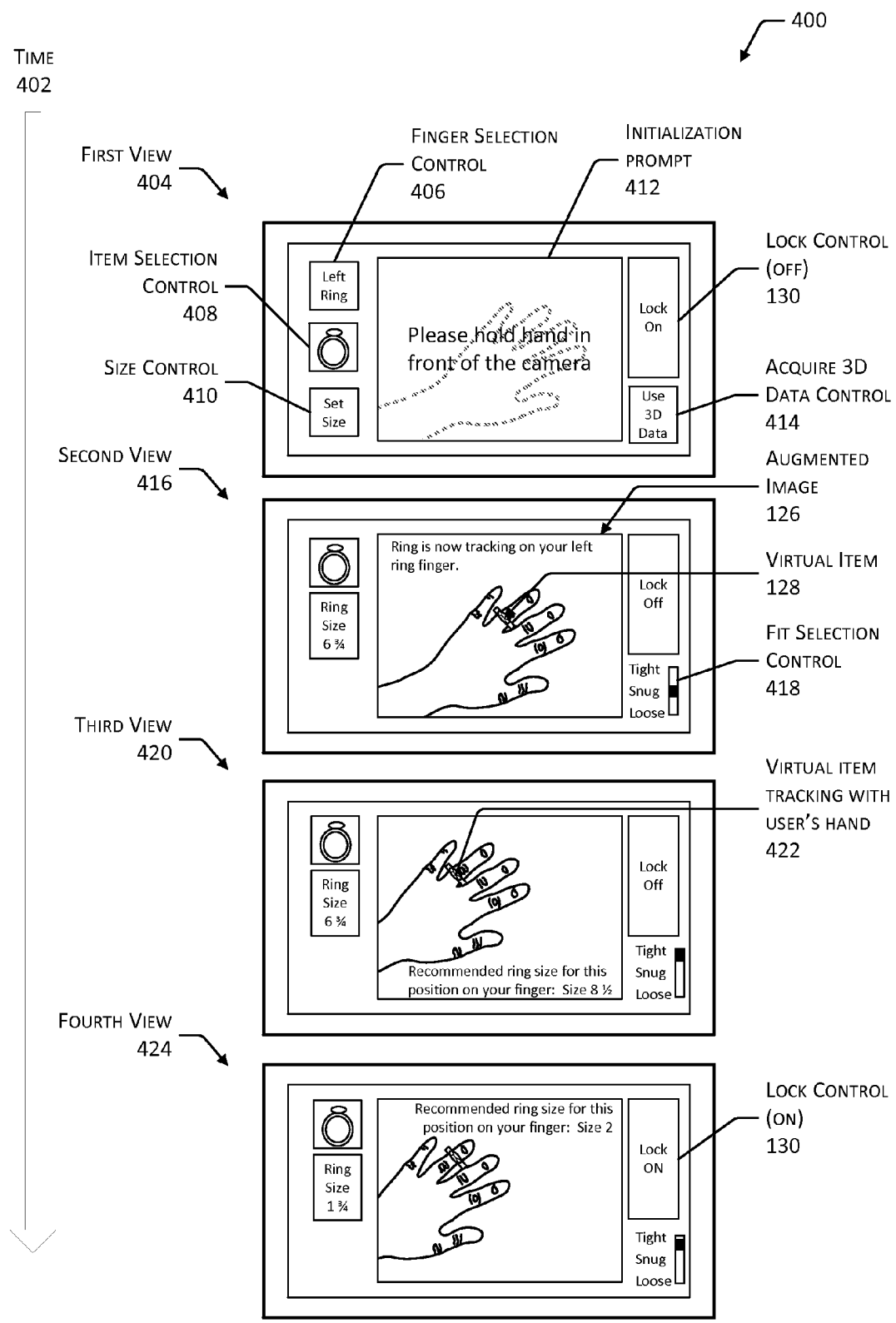
FIG. 4 illustrates a user interface over time in which a lock control is engaged and disengaged.

FIG. 4 illustrates a sequence 400 of the user interface 120 over time. Time is increasing down the page, as indicated by arrow 402. The user interface 120 depicted here may be provided by the user interface module 118 of the user device 104. By way of illustration and not as a limitation, in these views, the user interface 120 is configured for presentation of virtual items 128 representative of actual items comprising rings and where the actual object 102 in the augmented image 126 is one of the user's hands.

Depicted in a first view 404 is a finger selection control 406. The finger selection control 406 is configured to allow the user to select a particular finger upon which the virtual item 128 is to be presented. For example, the user may have selected to place the virtual item 128 on the left hand ring finger. The finger selection control 406 may provide a listing of fingers for selection or may initiate an automatic recognition of the user's fingers. During automatic recognition, the image data 110 may be processed to identify a particular finger of the user. In another implementation, automatic recognition may involve the user positioning their hand in a particular configuration. For example, the user may extend a desired finger away from the palm while the remaining fingers are not extended.

An item selection control 408 allows the user to select from among one or more available virtual items 128 available to present in the augmented image 126. A size control 410 allows the user to input a preferred or default ring size. For example, the user may activate the size control 410 to specify an initial ring size of "6¾".

The user interface 120 may present an initialization prompt 412. As shown here in the first view 404, the initialization prompt 412 may include a silhouette or outline of a left hand, with the palm apparently facing away from the camera 108. A lock control 130 may also be provided. The lock control 130 is configured to activate/deactivate a position lock function. The operation of the position lock function is discussed below in more detail. In the first view 404, the lock control 130 is "off". While the lock control 130 is depicted on one side of the display 106, in some implementations, the lock control 130 may be available on either side, or both sides, of the display 106 simultaneously. The lock control 130 may be configured to be accessible to the thumb of the user while holding the user device 104.

In some implementations, an acquire 3D data control 414 may be presented. This control 414 may be used to activate or deactivate gathering of 3D data 114 by the 3D sensor 112 of the actual object 102. For example, the user may activate the acquire 3D data control 414 to gather information about the actual object 102 such that measurements for making sizing recommendations may be gathered.

The second view 416 of the user interface 120 depicts presentation of the augmented image 126 generated by the augmented image generation module 122. As described above, the augmented image 126 combines images of the actual object 102 obtained from the camera 108 with images of the virtual item 128 generated from the distributed item data 124. As shown here, in the augmented image 126, the image of the ring virtual item 128 appears to be on the ring finger of the user's left hand positioned around the user's proximal phalanx bone.

The user interface 120 may also provide other controls, such as a fit selection control 418. The user may use this control 418 to input a preference as to how loose or tight they prefer a ring to fit. For example, as depicted here, the user set the fit selection control 418 to provide a "snug" fit, intermediate between tight and loose.

The augmented image generation module 122 may be configured to track the apparent motion of the actual object 102 in the image data 110 acquired by the camera 108. As illustrated in a third view 420, the image of the virtual item 128 is depicted as tracking 422 with actual object 102 of the user's hand. For example, as the user moves their hand to the left or rotates the hand so the palm is facing the camera 108, the virtual item 128 moves and rotates to match. In this way, the user may virtually interact with the virtual item 128.

As also shown in the third view 420, in some implementations, the user may be presented with information indicating the fit of the selected size. Continuing the example above, the user has specified using the size control 410 a ring size of "6¾". However, based on the 3D data 114 of the user's hand, the measured size of the ring finger at that position is determined to be a ring size of "8½". Based on this determination, a prompt or indication may be provided in the user interface 120. The prompt may be one or more of textual output such as depicted here, graphical output, audible output, or haptic output. For example, graphical output may include an element in the user interface 120 that changes color based on a relative difference in size between the actual object 102 and the virtual item 128. This prompt may indicate that the select ring size will not fit, suggest an alternative size, and so forth. For example, a border around the augmented image 126 may be configured to change color based on fit, with green indicating a typical fit, yellow indicating a snug fit, and red indicating a tight fit of the ring at a particular position on the user's hand. In the third view 420, a textual prompt is shown indicating the fit of the ring phrased as a recommendation that a size "8½" ring would be a better fit in the situation depicted.

The user may wish to change the apparent position in the augmented image 126 of the virtual item 128 with respect to the actual object 102. For example, the user may wish to see an augmented image 126 with the ring around the intermediate phalanx bone of the left hand ring finger.

A fourth view 424 depicts the lock control 130 as engaged, activating the position lock function. For example, the user's right thumb may activate the lock control 130. The position lock function fixes or locks an apparent position of the generated image of the virtual item 128 to a particular point within the augmented image 126 such that the image of the virtual item 128 remains stationary while the actual object 102 moves within the augmented image 126. The position lock function disables the tracking, such that the user may change the apparent position of the actual object 102, such as by moving their left hand or moving the user device 104, while the apparent position on the display 106 of the image of the virtual item 128 remains fixed. As illustrated here, the user has moved their hand such that the virtual item 128 is now proximate to the intermediate phalanx bone of the user's left hand. Once at the desired relative position, the user may deactivate the lock control 130. For example, the user may remove their right thumb from the lock control 130. Once deactivated, the virtual item 128 resumes tracking relative to the current position on the actual object 102.

The position of the lock control 130 may vary based on one or more of orientation of the user device 104, selected finger, and so forth. For example, the user may have instead chosen the right ring finger using the finger selection control 406. Based on this selection, the user interface module 118 may present the lock control 130 on the left side of the display, proximate to the user's left thumb.

Figure 5:
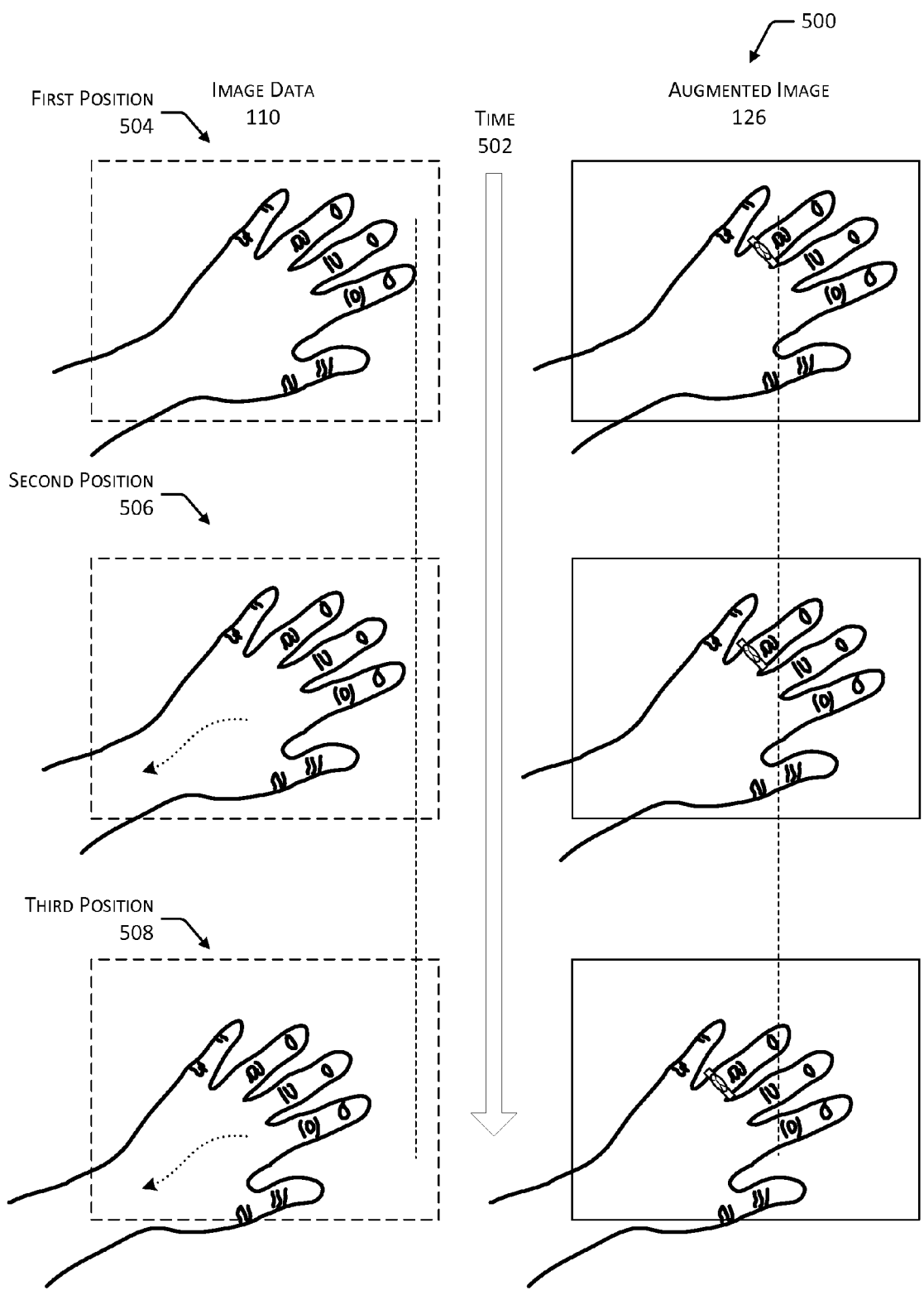
FIG. 5 illustrates when a position lock function is disengaged, such that in the augmented image, the virtual item tracks with the actual object.

FIG. 5 illustrates a series of images 500 when the position lock function is disengaged, such that in the augmented image 126, the virtual item 128 tracks with the actual object 102. In this illustration, a left column depicts image data 110, such as an image acquired by the camera 108, while a right column depicts the augmented image 126 as generated by the augmented image generation module 122. Time, as indicated by arrow 502, increases down the page. The actual object 102 is depicted here as a hand, and the virtual item 128 is depicted as a ring by way of illustration only and not as a limitation.

At a first position 504, the image data 110 depicts the actual object 102 and the corresponding augmented image 126 with the virtual item 128 apparently around the proximal phalanx bone of a left hand ring finger. In the second position 506, the user's hand has moved apparently down and to the left in the image data 110. For example, the user may have moved their hand or shifted the position of the user device 104. Because the lock is off, as illustrated in the corresponding augmented image 126, the virtual item 128 continues to track with the portion of the user's left hand corresponding to the proximal phalanx bone. As the apparent motion continues, as illustrated by the third position 508, the apparent position in the augmented image 126 of the actual object 102 and the image of the virtual item 128 have both changed, compared to the first position 504.

To provide for tracking of the actual object 102, one or more tracking points on the actual object 102 may be identified in the one or more images. For example, particular points along the edge of the actual object 102 may be identified based on an edge detection function, or a particular feature such as a skin wrinkle, freckle, or other marking may be designated as a tracking point.

Figure 6:
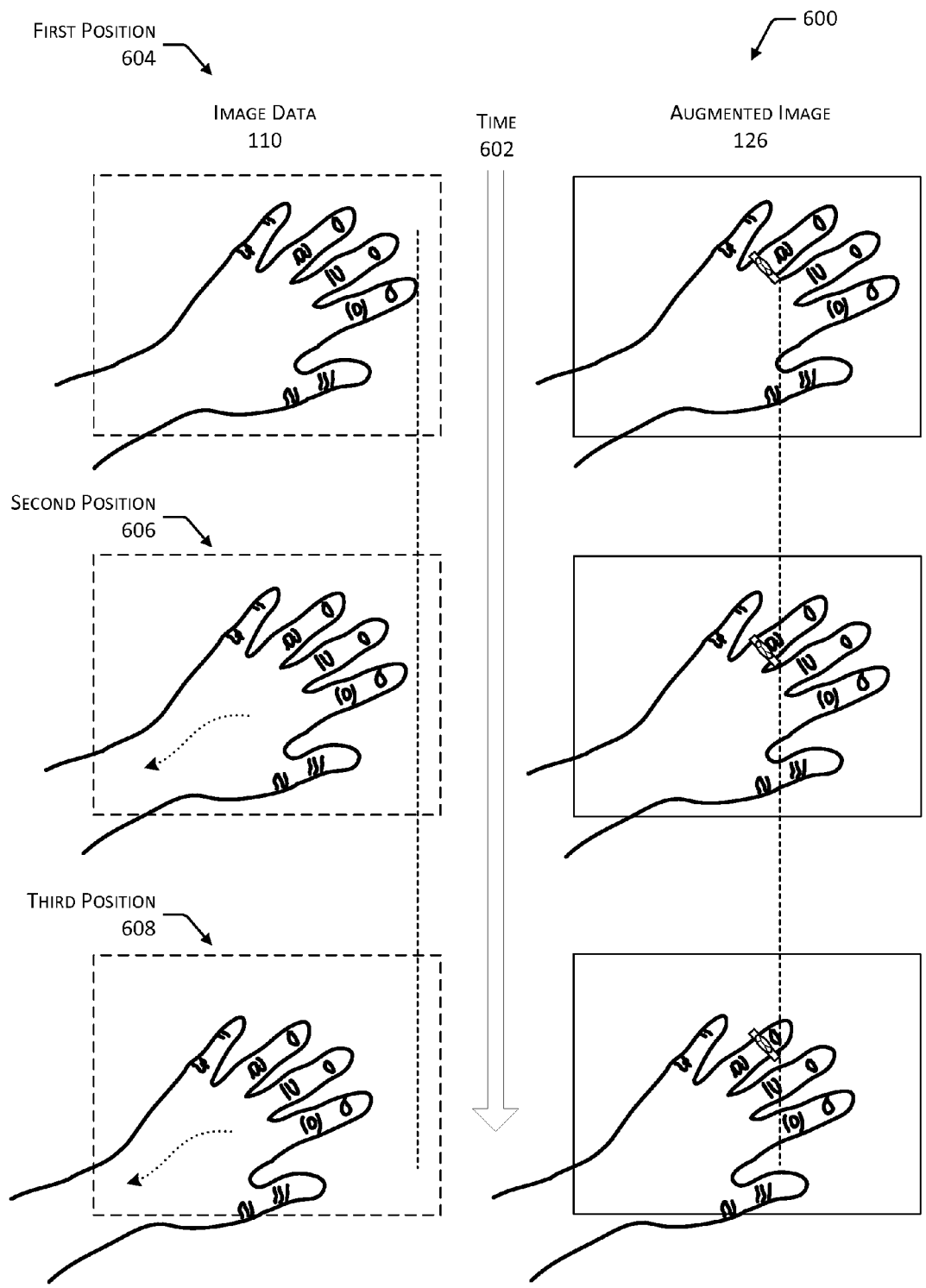
FIG. 6 illustrates when a position lock function is engaged, such that in the augmented image, the virtual item remains fixed at a position within an augmented image frame, while the actual object moves.

FIG. 6 illustrates a series of images 600 when a position lock function is engaged. As described above, the user may activate the lock control 130 as provided by the user interface 120. As above with regard to FIG. 5, time as indicated by arrow 602 increases down the page. The actual object 102 is depicted here as a hand, and the virtual item 128 is depicted as a ring by way of illustration only and not as a limitation.

At a first position 604, the image data 110 depicts the actual object 102 and the corresponding augmented image 126 with the virtual item 128 apparently around the proximal phalanx bone of a left hand ring finger. In the second position 606, with the lock control 130 engaged, the user's hand has moved apparently down and to the left in the image data 110. For example, the user may have moved their hand or shifted the position of the user device 104. Because the lock is activated, as illustrated in the corresponding augmented image 126, the virtual item 128 remains in a fixed location within a frame of the augmented image 126. Said another way, when the lock control 130 is engaged, the virtual item 128 no longer tracks with the actual object 102. In some implementations, the lock may be based on a particular point of the virtual item 128, such as an exterior point, geometric center, center of mass, and so forth. As the apparent motion continues, as illustrated by the third position 608, the apparent position in the augmented image 126 of the actual object 102 has changed, compared to the first position 604, while the apparent position of the ring virtual item 128 is around the intermediate phalanx of the user's left hand. Should the user deactivate the lock, the tracking of the virtual item 128 with the actual object 102 would resume.

Figure 7:
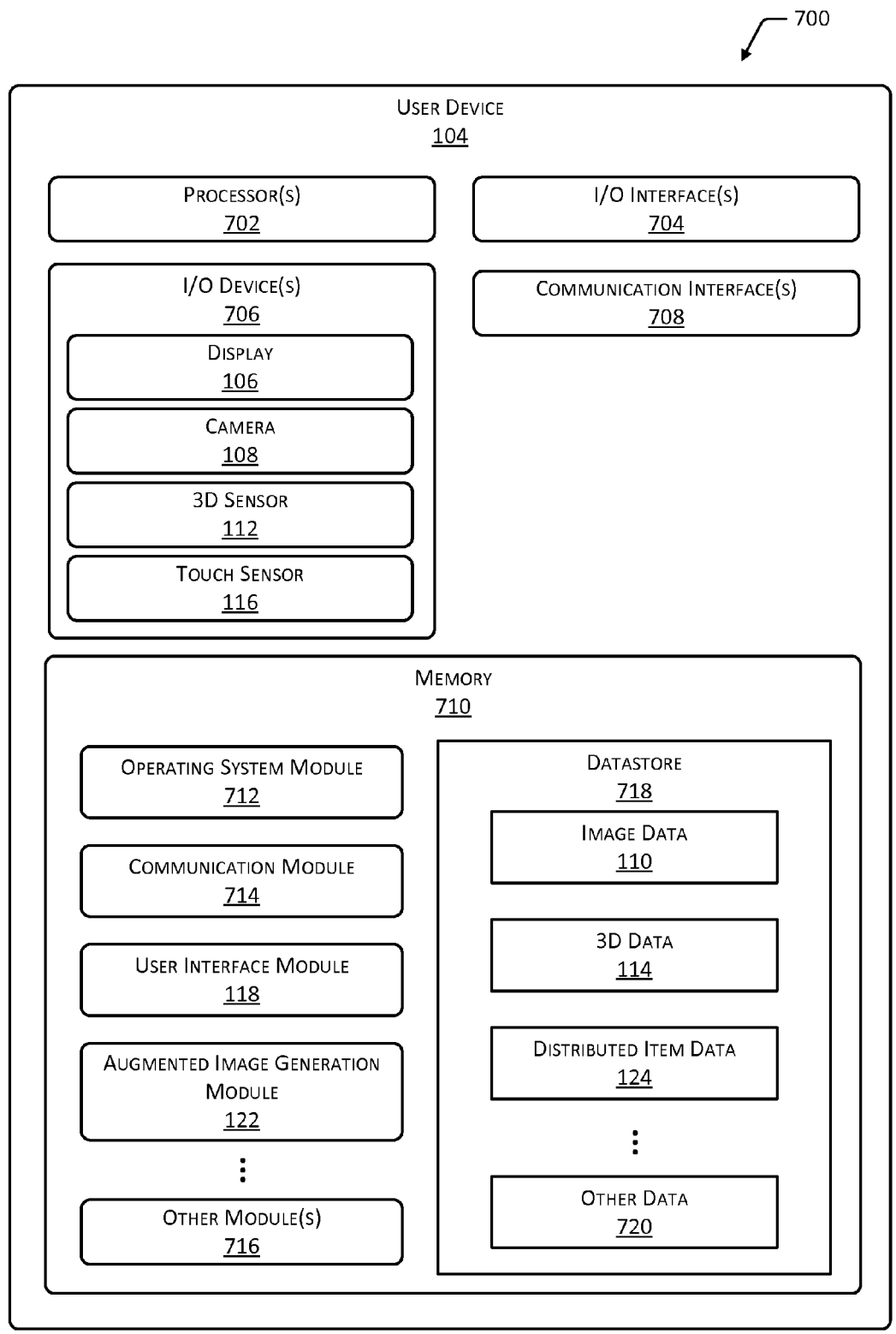
FIG. 7 illustrates a block diagram of a user device, which may be configured to provide the augmented reality image.

FIG. 7 illustrates a block diagram 700 of the user device 104. The user device 104 may include one or more processors 702 configured to execute one or more stored instructions. The processors 702 may comprise one or more cores. The user device 104 may include one or more input/output ("I/O") interface(s) 704 to allow the processor 702 or other portions of the user device 104 to communicate with other devices. The I/O interfaces 704 may comprise inter-integrated circuit ("I2C"), serial peripheral interface bus ("SPI"), Universal Serial Bus ("USB") as promulgated by the USB Implementers Forum, RS-232, one or more device interfaces such as High Definition Multimedia Interface ("HDMI") as promulgated by HDMI Licensing LLC, TOSLINK® as promulgated by Toshiba Corp., IEEE 1394 as promulgated by the IEEE, and so forth.

The I/O interface(s) 704 may couple to one or more I/O devices 706. The I/O devices 706 may include input devices such as the camera 108, the 3D sensor 112, the touch sensor 116, a microphone, a button, accelerometer, magnetometer, gyroscope, and so forth. The I/O devices 706 may also include output devices such as the display 106, audio speakers, haptic output devices, and so forth. The display 106 may comprise an electrophoretic display, projector, liquid crystal display, interferometric display, light emitting diode display, and so forth. In some embodiments, the I/O devices 706 may be physically incorporated with the user device 104 or may be externally placed.

The user device 104 may also include one or more communication interfaces 708. The communication interfaces 708 are configured to provide communications between the user device 104, other devices, the item server 134, routers, access points, servers, and so forth. The communication interfaces 708 may include devices configured to couple to one or more networks including personal area networks ("PANs"), local area networks ("LANs"), wireless local area networks ("WLANs"), wireless wide area networks ("WWANs"), and so forth.

The user device 104 may also include one or more busses or other internal communications hardware or software that allow for the transfer of data between the various modules and components of the user device 104.

As shown in FIG. 7, the user device 104 includes one or more memories 710. The memory 710 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 710 provides storage of computer readable instructions, data structures, program modules, and other data for the operation of the user device 104.

The memory 710 may include at least one operating system ("OS") module 712. The OS module 712 is configured to manage hardware resource devices such as the I/O interfaces 704, the I/O devices 706, the communication interfaces 708, and provide various services to applications or modules executing on the processors 702. Also stored in the memory 710 may be one or more of the following modules. These modules may be executed as foreground applications, background tasks, daemons, and so forth.

A communication module 714 is configured to support communication with the item server 134 or other devices using the network 132. The communication module 714 may be configured to encrypt or otherwise protect the data transferred between the item server 134 and other devices. For example, hypertext transport protocol secured ("HTTPS") or transport layer security ("TLS") may be supported. The communication module 714 may also be configured to facilitate transfer of the distributed item data 124 from the item server 134 to the user device 104.

As described above, the user interface module 118 is configured to provide the user interface 120. This user interface 120 may comprise one or more of a graphical user interface, an audible user interface, or a haptic user interface. The user interface module 118 is configured to process inputs, such as those made to the touch sensor 116, and provide corresponding outputs to the user, such as on the display 106, using audio speakers, and so forth. For example, the user interface module 118 may interpret a touch on a particular area of the touch sensor 116 as being an activation of the lock control 130.

The augmented image generation module 122 is configured to access the distributed item data 124 and generate an augmented image 126. As described above, the augmented image 126 includes images of one or more virtual items 128 combined with an image of the actual object 102 acquired by the camera 108.

Other modules 716 may also be present. For example, application modules may be present to provide eBook readers, browsers, calculators, word processors, spreadsheets, slideshow presenters, drawing programs, and so forth.

The memory 710 may also include a datastore 718 to store information. The datastore 718 may use a flat file, database, linked list, tree, executable code, or other data structure to store the information. In some implementations, the datastore 718 or a portion of the datastore 718 may be distributed across one or more other devices including servers, network attached storage devices, and so forth.

As depicted here, the datastore 718 may store one or more of the image data 110, the 3D data 114, or the distributed item data 124. Other data 720 may also be stored. For example, the other data 720 may include user preferences, configuration files, and so forth.

Figure 8:
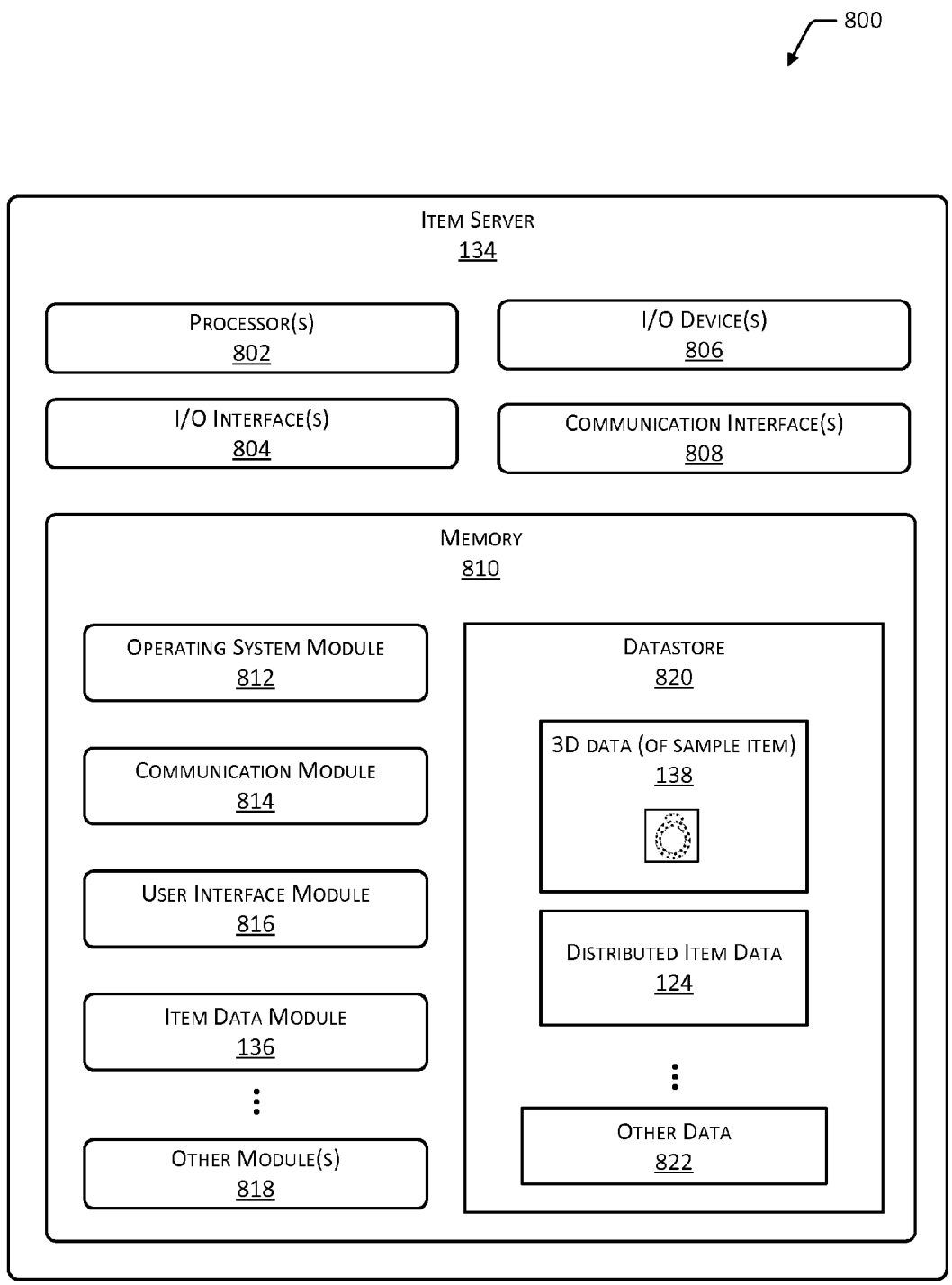
FIG. 8 illustrates a block diagram of an item server, which may be configured to generate the distributed item data and send the distributed item data to one or more user devices for presentation of the virtual item.

FIG. 8 illustrates a block diagram 800 of the item server 134. As described above, the item server 134 may be configured to generate the distributed item data 124, send the distributed item data 124 to one or more user devices 104, and so forth.

The item server 134 may include one or more processors 802 configured to execute one or more stored instructions. The processors 802 may comprise one or more cores. The item server 134 may include one or more I/O interface(s) 804 to allow the processor 802 or other portions of the item server 134 to communicate with other devices. The I/O interfaces 804 may comprise I2C, SPI, USB, RS-232, and so forth.

The I/O interface(s) 804 may couple to one or more I/O devices 806. The I/O devices 806 may include input devices such as one or more of a keyboard, mouse, and so forth. The I/O devices 806 may also include output devices such as one or more of a display, audio speakers, haptic output devices, and so forth. In some embodiments, the I/O devices 806 may be physically incorporated with the item server 134 or may be externally placed.

The item server 134 may also include one or more communication interfaces 808. The communication interfaces 808 are configured to provide communications between the item server 134 and the user devices 104, routers, access points, servers, and so forth. The communication interfaces 808 may include devices configured to couple to one or more networks including PANs, LANs, WLANs, WWANs, and so forth.

The item server 134 may also include one or more busses or other internal communications hardware or software that allow for the transfer of data between the various modules and components of the item server 134.

As shown in FIG. 8, the item server 134 includes one or more memories 810. The memory 810 comprises one or more CRSM. The memory 810 provides storage of computer readable instructions, data structures, program modules, and other data for the operation of the item server 134.

The memory 810 may include at least one OS module 812. The OS module 812 is configured to manage hardware resource devices such as the I/O interfaces 804, the I/O devices 806, the communication interfaces 808, and provide various services to applications or modules executing on the processors 802. Also stored in the memory 810 may be one or more of the following modules. These modules may be executed as foreground applications, background tasks, daemons, and so forth.

A communication module 814 is configured to support communication with the user devices 104, routers, and so forth, using the network 132. In some implementations, the communication module 814 may support encrypted communications. For example, HTTPS or TLS may be supported.

A user interface module 816 may be configured to provide one or more application programming interfaces. The user interface module 816 may also provide data configured to provide the user interfaces 120 on the user devices 104, such as Hypertext Markup Language ("HTML") files. The user interface module 816 is configured to accept inputs and send outputs using the I/O interfaces 804, the communication interfaces 808, or both.

The item data module 136 may be configured to provide distributed item data 124, or a portion thereof, to the user device 104. The item data module 136 may also be configured to process the 3D data 138 about the actual item that the virtual item 128 represents, to generate the distributed item data 124. For example, a device, such as the user device 104, may send the 3D data 138 of an actual item to the item server 134. Other data may also be sent, such as image data 110 of the actual item, manually input information, and so forth. For example, the user adding the virtual item 128 may manually specify the material of a ring as 24 k gold, indicate the gemstone is a topaz, and so forth. The item data module 136 may use the 3D data 138, image data, manual input 110, and so forth, to generate the distributed item data 124.

Other modules 818 may also be present. For example, an order fulfillment module may be configured to support placement of an order for a selected virtual item 128.

The memory 810 may also include a datastore 820 to store information. The datastore 820 may use a flat file, database, linked list, tree, executable code, or other data structure to store the information. In some implementations, the datastore 820 or a portion of the datastore 820 may be distributed across one or more other devices including servers, network attached storage devices, and so forth.

As depicted here, the datastore 820 may store one or more of the 3D data 138 or the distributed item data 124. Other data 822 may also be stored. For example, the other data 822 may include manually input information about the actual item, such as material composition, type of gemstone, and so forth.

Illustrative Processes

Figure 9:
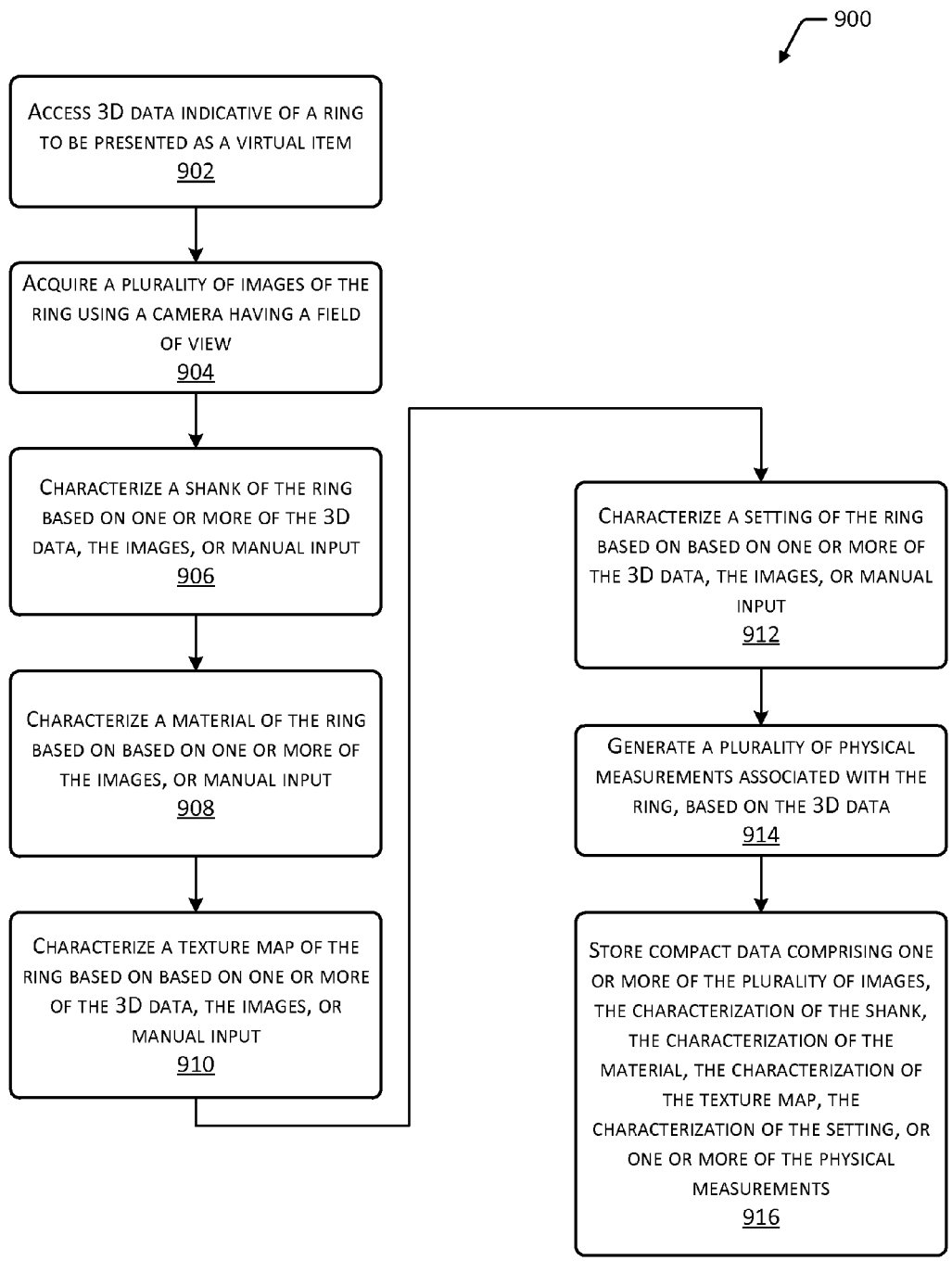
FIG. 9 is a flow diagram of a process of generating compact data.

FIG. 9 is a flow diagram 900 of a process of generating the compact data 204. In some implementations, the process of generating the compact data 204 may be implemented by the item data module 136, which may execute at least in part on the item server 134.

Block 902 accesses 3D data 138 indicative of an actual item to be presented as a virtual item 128. In some implementations, the actual item may comprise a piece of jewelry, such as a ring. This acquisition may be from a 3D sensor 112, such as present in the user device 104 or a dedicated sensing platform. The 3D data 138 may comprise a depth map, point cloud, vector mapping, and so forth. The 3D sensor 112 may include one or more devices, such as an optical time-of-flight sensor comprising an emitter and a detector camera; a structured light sensor comprising a structured light emitter and a camera; a stereovision sensor comprising a plurality of cameras; an interferometer comprising a coherent light source and a detector; or a camera having a coded aperture. In other implementations, other devices configured to generate 3D data 138 may be used. The 3D sensor 112 may be configured to provide 3D data 138 with a resolution of less than one millimeter. For example, in a depth map, the 3D sensor 112 may be able to resolve a 1 mm relative difference between two adjacent pixels in the depth map. In other implementations, higher or lower resolutions may be used.

Block 904 acquires a plurality of images of the actual item from a plurality of orientations. For example, pictures may be taken of the actual item from several different points of view.

Block 906 characterizes one or more portions of the actual item, such as a shank of the ring. This characterization may be based at least in part on one or more of: the 3D data 138, at least a portion of the plurality of images, or manual input. For example, the 3D data 138 may indicate that the ring shank has an elliptical cross section, which the user may confirm via manual input. This characterization may result in generating the shank cross section descriptor 204(2) described above.

Block 908 characterizes one or more materials of the actual item. For example, the composition of the ring may be characterized and associated with the material data 206. This characterization may be based at least in part on one or more of: at least a portion of the plurality of images or manual input. Continuing the example, the user may manually enter that the ring shank is made of 24 k gold. In another implementation, based on information in the image, the material may be recognized, such as jade.

Block 910 characterizes a texture map of the actual item. Continuing the example, a texture map for the ring may be determined from the texture map data 208. This characterization may be based at least in part on one or more of: the 3D data 138, at least a portion of the plurality of images, or manual input. For example, the image data 110 may be used to select the texture map data 208 corresponding to jade.

Block 912 characterizes one or more particular structures of the actual item. For example, where the actual item comprises a ring, the setting may be characterized. This characterization may be based at least in part on one or more of: the 3D data 138, at least a portion of the plurality of images, or manual input. For example, the geometry of the setting may be compared with those previously stored in the setting data 210 to determine a match. When such a match is located in the setting data 210, the corresponding setting identifier 210(1) may be stored in the compact data 204.

Characterization may include pattern matching, image recognition, heuristic analysis, machine learning, and so forth. For example, the color and albedo of a material may be compared with previously entered material data 206 to characterize a smooth surface that is yellow and has a high albedo as comprising gold. In some implementations where the characterization is uncertain, information indicative of a confidence in the characterization may be presented. For example, the user interface 120 may include a prompt which says "this ring appears to be made of gold or brass, but the merchant has not confirmed this." In some implementations where the characterization is made using a known-good party, such as a third party lab, this characterization may be indicated. For example, information indicating identification and characterization by the Gemological Institute of America may be presented in the user interface 120.

Where the characterization fails to result in a corresponding match with preexisting information in the common data 202, that characterization may be added to the common data 202. For example, a new gallery geometry 210(4) may be added.

Block 914 generates a plurality of physical measurements associated with the actual item. For example, the plurality of physical measurements may include one or more of overall height, overall width, overall thickness, inner diameter of a ring shank, exterior diameter of a ring shank, mass, and so forth. The physical measurements may be based on one or more of: the 3D data 138, other instruments such as a scale, manual input, and so forth.

Block 916 stores compact data 204. As described above with regard to FIG. 2, the compact data 204 for a ring may comprise one or more of: the plurality of images, the characterization of the shank of the ring, the characterization of the one or more materials of the ring, the characterization of the texture map of the ring, the characterization of the setting, or the one or more of the physical measurements.

In some implementations, a first server or other device may be configured to generate the compact data 204, while a second server or other device may be configured to distribute the compact data 204 to the user device 104. For example, a wholesale merchant may build the compact data 204 for a particular virtual item 128 and upload that compact data 204 to a catalog maintained by a retail merchant. The wholesale merchant may send the compact data 204 to the server of the retail merchant. The retail merchant server may then be configured to distribute the compact data 204 to one or more of the user devices 104.

In some implementations, the item data module 136 or another module may be configured to receive a request for compact data 204. Based at least in part on that request, the compact data 204 may be sent to the user device 104. The user device 104 may receive the compact data 204. The augmented image generation module 122 of the user device 104 may then generate an augmented image 126 comprising an image of the actual object 102, such as at least a portion of the one or more user's fingers, and a generated image of the virtual item 128, such as the ring. The image of the virtual item 128 is based at least in part on the compact data 204.

Figure 10:
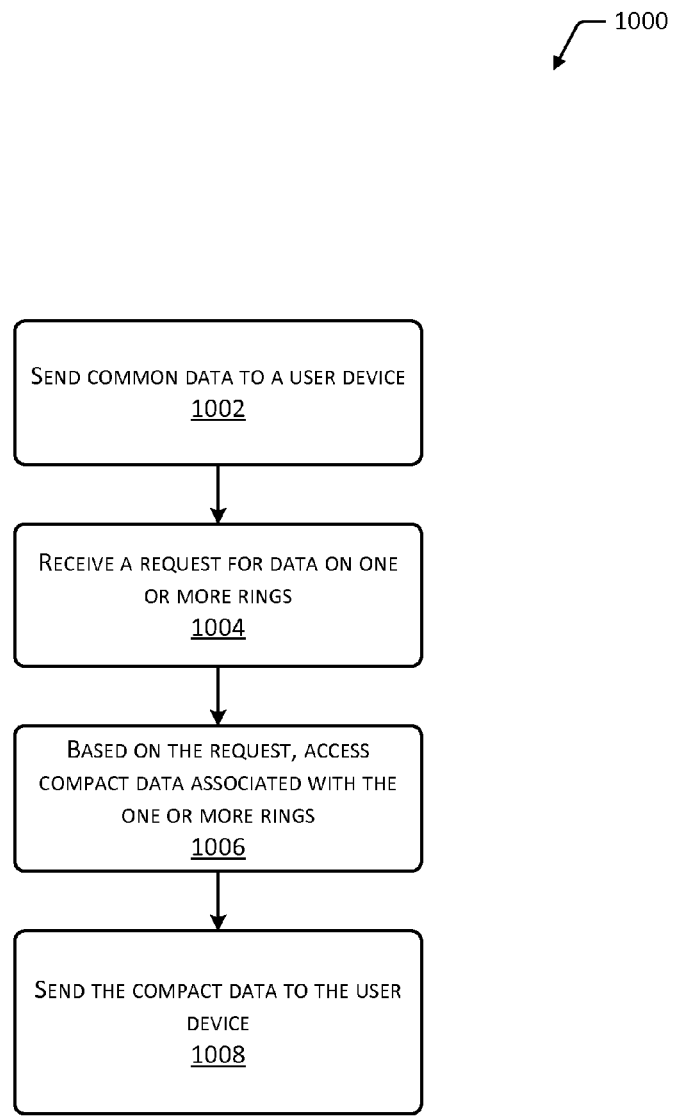
FIG. 10 is a flow diagram of a process of sending compact data to the user device, where the user device stores common data referred to by the compact data.

FIG. 10 is a flow diagram of a process 1000 of sending compact data 204 to the user device 104. As described above with regard to FIG. 3, the user device 104 may be configured to store the common data 202, which is referred to by the compact data 204. In some implementations, the process 1000 may be implemented by the item data module 136, which may execute at least in part on the item server 134.

Block 1002 sends the common data 202 to the user device 104. For example, the communication module 814 of the item server 134 may establish a connection with the communication module 714 of the user device 104. Once established, the common data 202, or a portion thereof, may be transferred.

Block 1004 receives a request for data on one or more virtual items 128, such as rings or other jewelry. In one implementation, the request may originate from the user device 104. In another implementation, the request may originate from another device or service, such as an advertising campaign server coordinating presentation of advertisements for a particular gold ring.

Based on the request, block 1006 accesses the compact data 204 associated with the one or more virtual items 128. Continuing the example, the compact data 204 associated with the particular gold ring being advertised may be retrieved from the data store 820.

Block 1008 sends the compact data 204 to the user device 104. In some implementations, the compact data 204 may be embedded or otherwise encoded in another document. For example, a popup advertisement may include the compact data 204 for the virtual item 128 featured in that advertisement.

Figure 11:
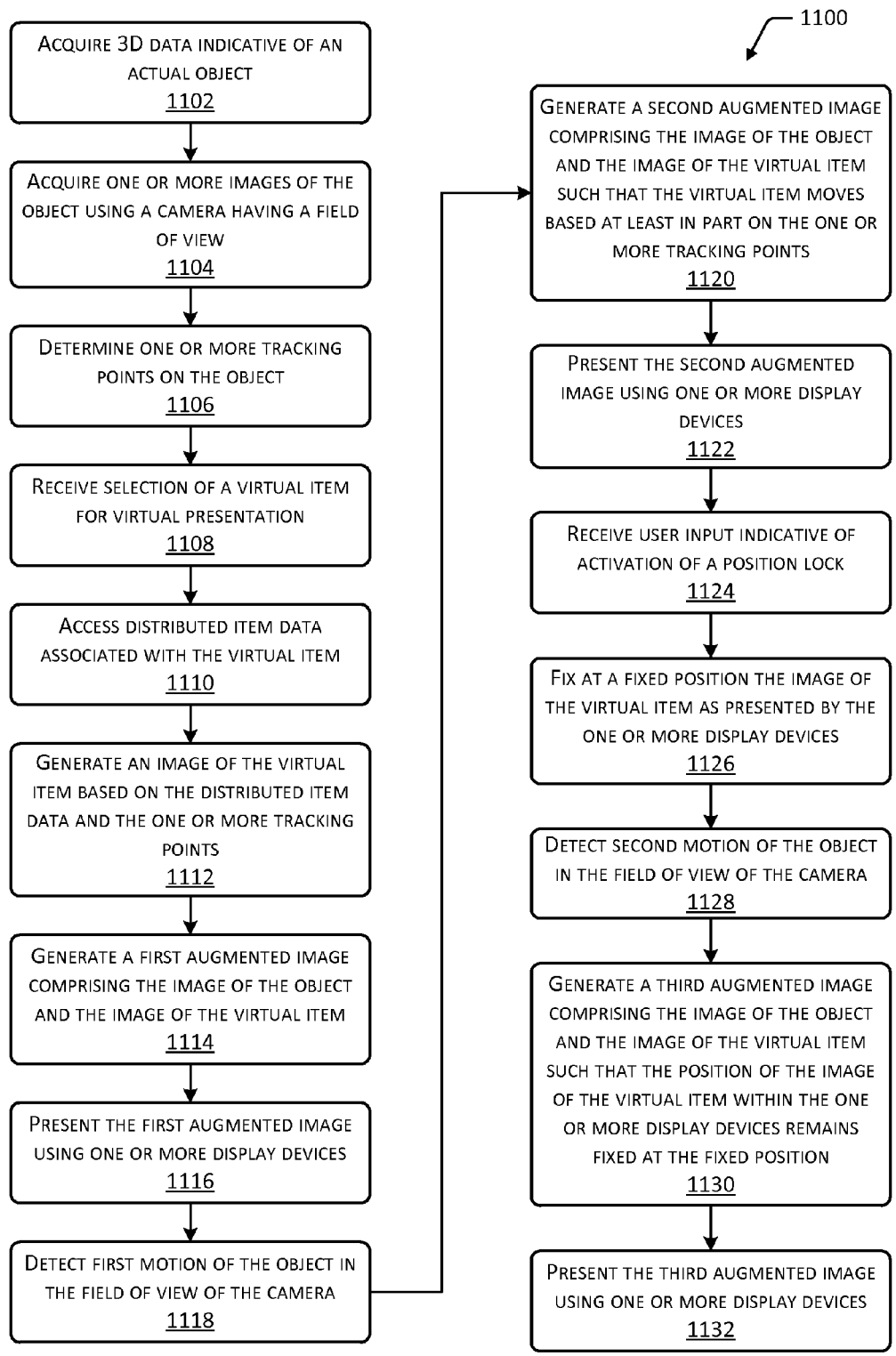
FIG. 11 is a flow diagram of presenting an augmented image and locking the position of the virtual item.

FIG. 11 is a flow diagram of a process 1100 of presenting an augmented image 126 and using the lock control 130 to lock the position of the virtual item 128 in that augmented image 126. As described above, the user may wish to lock the position of the virtual item 128 so as to reposition it with respect to the image of the actual object 102 appearing in the augmented image 126 in the user interface 120. In some implementations, the process 1100 may be implemented by one or more of the user interface module 118 or the augmented image generation module 122.

Block 1102 acquires or accesses 3D data 114 indicative of an actual object 120. For example, the 3D sensor 112 may scan the actual object 102 to acquire the 3D data 114 or a previously stored set of 3D data 114 may be retrieved.

Block 1104 acquires one or more images of the actual object 102 using a camera 108 having a field of view. The one or more images may be stored as image data 110.

Block 1106 determines one or more tracking points on the actual object 102, based on the one or more images. For example, particular points along the edge of the actual object 102 may be identified based on an edge detection function, or a particular feature such as a skin wrinkle, freckle, or other marking, may be designated as a tracking point. The tracking may be based at least in part on the threshold value, which may be used to provide for a "snap" function of the virtual item 128 relative to the actual object 102 in the image data 110. The threshold value may be fixed or dynamically adjustable. For example, the threshold value may dynamically vary based at least in part on the actual dimensions of a portion of the actual object 102 as determined by the 3D data 114, such that a larger actual object 102 has a larger "snap" distance.

Block 1108 receives selection of a virtual item 128 for virtual presentation. For example, the user may activate the item selection control 408 in the user interface 120 to pick a particular ring to present.

Block 1110 accesses distributed item data 124 associated with the virtual item 128. For example, the compact data 204 and the corresponding pieces of the common data 202 may be retrieved.

Block 1112 generates an image of the virtual item 128 based on the distributed item data 124 and the one or more tracking points. The one or more tracking points may be used to specify a particular orientation for the virtual item 128 to appear in. For example, where the one or more tracking points indicate the back of the user's hand is facing towards the camera 108 and where the virtual item 128 comprises a ring, the setting of the ring may be presented instead of the bottom of the shank.

Block 1114 generates a first augmented image 126(1) comprising the image of the actual object 102 and the image of the virtual item 128. Block 1116 presents the first augmented image 126(1) using one or more display devices 106. Block 1118 may determine or detect a first motion of the actual object 102 in the field of view of the camera 108. For example, the user may begin to move their hand in front of the camera 108.

Block 1120 generates a second augmented image 126(2) comprising the image of the actual object 102, now moved, and the image of the virtual item 128 such that the virtual item 128 moves based at least in part on the one or more tracking points. Block 1122 presents the second augmented image 126(2) using one or more display devices 106. Continuing the example, to the user, the ring virtual item 128 appears to be following the original point on their hand while the hand moves.

Block 1124 receives user input indicative of activation of a position lock function. For example, the user may have placed a thumb on the lock control 130. The touch sensor 116 may detect the user input of the thumb touch at the position of the lock control 130. As described above, the lock control 130 may be placed at a specified position at a left side, a right side, or a left and right side of the touch sensor 116 which is accessible by the user's left thumb or right thumb, respectively.

Block 1126 fixes, at a fixed position, the image of the virtual item 128 in an image frame as presented by the one or more display devices 106. For example, if the virtual item 128 is presented with a center point located at coordinates (251, 119) in the displayed image, the fixed position would be (251, 119).

Block 1128 detects or determines a second motion of the actual object 102 in the field of view of the camera 108. For example, now that the lock control 130 is activated, the user may continue movement of their hand.

Block 1130 generates a third augmented image 126(3) comprising the image of the actual object 102 and the image of the virtual item 128 such that the position of the image of the virtual item 128 within the image frame as presented by the one or more display devices remains fixed at the fixed position. Continuing the example, while the user's hand appears to move around in the user interface 120, the virtual item 128 remains with a center point at coordinates (251, 119). In one implementation, the pose or orientation of the virtual item 128 may remain locked. In another implementation, the pose or orientation of the virtual item 128 may continue to be updated based at least in part on the change in pose or orientation of the actual object 102. For example, an apparent orientation of the virtual item 128 in the augmented image 126 may vary based at least in part on motion of the actual object 102 while the position of the virtual item 128 remains locked or constant. Block 1132 presents the third augmented image 126(3) using one or more display devices 106.

As described above, in some implementations, the augmented image generation module 122 may be configured to provide additional functions. These additional functions may include performing one or more of the following.

The user may choose to disengage the position lock function by removing their thumb from the lock control 130 or providing another user input. In some implementations, the position lock function may automatically disengage after a predetermined interval of time, change in orientation or position of the actual object 102 beyond a predetermined threshold, and so forth.

Upon disengagement of the position lock function, the image of the virtual item 128 subsequently begins tracking with the actual object 102 as the actual object 102 moves within the augmented image 126. As a result, the relative position between the image of the virtual item 128 and the image of the actual object 102 remains constant.

One function may provide indication of fit, such as described above with regard to FIG. 4. One or more blocks may acquire the 3D data 114 of at least a portion of the actual object 102. Based on the 3D data 114, one or more physical measurements of the actual object 102 may be determined. One or more physical measurements 204(1) of the virtual item 128 may be accessed. Based on the one or more physical measurements of the actual object 102 and the physical measurements 204(1) of the virtual item 128, an indication of fit of the virtual item 128 relative to the actual object 102 may be generated.

Another function may provide a suggestion as to size. One or more blocks may acquire the 3D data 114 of at least a portion of the actual object 102. Based on the 3D data 114, one or more physical measurements of the actual object 102 may be determined. One or more physical measurements 204(1) of a plurality of sizes of the virtual item 128 may be accessed. Based on the one or more physical measurements of the actual object 102 and the physical measurements 204(1) of the different sizes of virtual item 128, one or more suggested sizes are generated.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of devices, environments, and situations.

Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A computer-implemented method for an augmented reality interaction, the computer-implemented method comprising:
acquiring three-dimensional sensor data indicative of an object;
acquiring one or more images of the object using a camera having a field of view;
determining one or more tracking points on the object based on the one or more images;
receiving selection of a virtual item for virtual presentation;
accessing distributed item data associated with the virtual item;
generating an image of the virtual item based on the distributed item data and the one or more tracking points;
generating a first augmented image comprising the image of the object and the image of the virtual item;
presenting the first augmented image using one or more display devices;
detecting first motion of the object in the field of view of the camera;

generating a second augmented image comprising the image of the object and the image of the virtual item such that the virtual item moves based at least in part on the one or more tracking points;

presenting the second augmented image using the one or more display devices;

receiving user input indicative of activation of a position lock function;

fixing, at a fixed position, the image of the virtual item as presented by the one or more display devices;

detecting a second motion of the object in the field of view of the camera;

generating a third augmented image comprising the image of the object and the image of the virtual item such that the position of the image of the virtual item within the one or more display devices remains fixed at the fixed position; and presenting the third augmented image using the one or more display devices.

2. The computer-implemented method of claim 1, wherein the object comprises a user's hand and the virtual item is representative of an ornamental ring.

3. The computer-implemented method of claim 1, wherein the position lock function is activated based on input received from a touch sensor, the input corresponding to a specified position at a left side, a right side, or a left and right side of the touch sensor accessible by a user's left thumb or right thumb, respectively.

4. The computer-implemented method of claim 1, wherein the distributed item data comprises common data and compact ring data, further wherein:

the common data is indicative of one or more of:
material data associating a material identifier with information indicative of one or more physical characteristics of one or more of mineral, metal, glass, or plastic;

texture map data associating a texture map identifier with a texture map comprising a bitmap or raster data configured to be applied to one or more polygons used to generate the image of the virtual item; and setting data associating a setting identifier with a one or more of a stone identifier, stone cut, gallery geometry, gallery texture, or gallery material identifier; and the compact ring data comprises data indicative of one or more of a shank cross section descriptor, the shank material identifier referring to the material identifier, the texture map identifier, or the setting identifier.

5. A method comprising:
generating an augmented image comprising an image of an actual object and a generated image of a virtual item;

receiving user input indicative of activation of a position lock function; and locking a position of the generated image of the virtual item to a particular point within the augmented image such that the image of the virtual item remains stationary while the actual object moves within the augmented image.

6. The method of claim 5, wherein the virtual item comprises a representation of:
a ring;
a wrist bracelet;
an ankle bracelet;
a watchband;
an armlet; or
a toe ring.

7. The method of claim 5, further comprising:
acquiring three-dimensional sensor data of at least a portion of the actual object;

based on the three-dimensional sensor data, determine one or more physical measurements of the actual object;

accessing one or more physical measurements of the virtual item; and generating an indication of fit of the virtual item relative to the actual object.

8. The method of claim 5, further comprising:
acquiring three-dimensional sensor data of the actual object;

based on the three-dimensional sensor data, determining one or more physical measurements of the actual object;

accessing one or more physical measurements of a plurality of sizes of the virtual item; and generating one or more suggested sizes based at least in part on the three-dimensional sensor data and the plurality of sizes of the virtual item.

9. The method of claim 5, wherein apparent orientation of the virtual item in the augmented image varies based at least in part on motion of the actual object while the position remains locked.

10. The method of claim 5, wherein the user input indicative of activation of the position lock function comprises a touch to a specified area on a left side, a right side, or a left and right side of a touch sensor accessible by a user's left thumb or right thumb, respectively.

11. The method of claim 5, wherein the virtual item comprises an ornamental ring; and further comprising:
receiving compact ring data associated with the virtual item, wherein the compact ring data contains one or more references to data stored within one or more previously stored data structures; and generating the image of the virtual item based on the data stored within the one or more previously stored data structures referred to by the compact ring data.

12. The method of claim 5, further comprising:
unlocking the position of the generated image of the virtual item to the particular point within the augmented image such that the image of the virtual item tracks with the actual object as the actual object moves within the augmented image to remain in a constant relative position.

13. A system comprising:
a communication interface;
a three-dimensional sensor device configured to generate three-dimensional data about a ring to be presented as a virtual item;
a memory storing first computer-executable instructions; and
at least one processor configured to couple to the communication interface, the three-dimensional sensor device, access the memory, and execute the computer-executable instructions to:
access the three-dimensional data about the ring;
acquire a plurality of images of the ring from a plurality of orientations;
characterize a shank of the ring based on one or more of: the three-dimensional data, at least a portion of the plurality of images, or manual input;
characterize one or more materials of the ring based on one or more of: at least a portion of the plurality of images, or manual input;
characterize a texture map of the ring based on one or more of: the three-dimensional data, at least a portion of the plurality of images, or manual input;

characterize a setting of the ring based on one or more of: the three-dimensional data, at least a portion of the plurality of images, or manual input;

generate a plurality of physical measurements associated with the ring, based on one or more of: the three-dimensional data, or manual input; and store compact ring data comprising one or more of:
the plurality of images of the ring,
the characterization of the shank of the ring,
the characterization of the one or more materials of the ring,
the characterization of the texture map of the ring,
the characterization of the setting, or
at least a portion of the plurality of physical measurements associated with the ring.

14. The system of claim 13, wherein the three-dimensional sensor device comprises one or more of:
an optical time-of-flight sensor comprising an emitter and a detector camera;
a structured light sensor comprising a structured light emitter and a camera;
a stereovision sensor comprising a plurality of cameras;
an interferometer comprising a coherent light source and a detector; or
a camera having a coded aperture.

15. The system of claim 13, wherein the three-dimensional data has a resolution of less than one millimeter.

16. The system of claim 13, further comprising instructions to:
send, using the communication interface, the compact ring data to a server, wherein the server is configured to distribute the compact ring data to one or more user devices.

17. The system of claim 13, further comprising instructions to:
receive, using the communication interface, a request to send the compact ring data to a user device; and
send, using the communication interface, the compact ring data to the user device.

18. The system of claim 17, wherein the user device comprises:
a display device;
a camera;
a communication interface;
a touch sensor;
a memory storing first computer-executable instructions; and
at least one processor configured to couple to the display device, the camera, the communication interface, the touch sensor, access the memory, and execute the computer-executable instructions to:
receive the compact ring data; and
generate an augmented image comprising an image of at least a portion of one or more of a user's fingers and a generated image of the ring based at least in part on the compact ring data.

19. The system of claim 18, wherein the user device further comprises instructions to:
receive, using the touch sensor, user input indicative of activation of a position lock function; and
lock a position of the generated image of the ring to a particular point within the augmented image such that the image of the virtual item remains stationary while the one or more of the user's fingers move within the augmented image.

20. The system of claim 19, the user device further comprising a three-dimensional sensor device configured to generate three-dimensional data about the one or more of the user's fingers; and wherein the user device further comprises instructions to:
based on the three-dimensional data, determine one or more physical measurements of the one or more of the user's fingers;
access one or more physical measurements of the ring stored in the compact ring data;
generate an indication of fit of the ring on one or more of the user's fingers; and
present the indication of fit of the ring to the user in the augmented image.

* * * * *